(12) United States Patent
Tan et al.

(10) Patent No.: US 10,517,422 B2
(45) Date of Patent: Dec. 31, 2019

(54) COFFEE ROASTING APPARATUS, COFFEE BREWING APPARATUS AND COFFEE ROASTING METHOD

(71) Applicant: KONINKLIJKE PHILIPS N.V., Eindhoven (NL)

(72) Inventors: Jingwei Tan, Eindhoven (NL); Jun Zhou, Eindhoven (NL); Jun Shi, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 167 days.

(21) Appl. No.: 15/527,732

(22) PCT Filed: Nov. 13, 2015

(86) PCT No.: PCT/EP2015/076503
§ 371 (c)(1),
(2) Date: May 18, 2017

(87) PCT Pub. No.: WO2016/083148
PCT Pub. Date: Jun. 2, 2016

(65) Prior Publication Data
US 2017/0319002 A1    Nov. 9, 2017

(30) Foreign Application Priority Data

Nov. 25, 2014 (WO) ................. PCT/CN2014/092111
Mar. 17, 2015 (EP) ..................................... 15159350

(51) Int. Cl.
*A47J 31/42* (2006.01)
*A23N 12/08* (2006.01)
(Continued)

(52) U.S. Cl.
CPC ................. *A47J 31/42* (2013.01); *A23F 5/04* (2013.01); *A23N 12/08* (2013.01); *A23N 12/125* (2013.01)

(58) Field of Classification Search
CPC ................. A47J 31/42; A23F 5/04–06; A23N 12/08–125
See application file for complete search history.

(56) References Cited

U.S. PATENT DOCUMENTS

| 4,988,590 | A | * | 1/1991 | Price | A23F 5/046 426/467 |
| 6,607,768 | B1 | * | 8/2003 | Eichner | A23F 5/046 34/360 |

(Continued)

FOREIGN PATENT DOCUMENTS

| CN | 1278705 A | 1/2001 |
| CN | 2855104 Y | 1/2007 |

(Continued)

OTHER PUBLICATIONS

JP2001104161A translation, published Apr. 17, 2001 (Year: 2001).*
(Continued)

Primary Examiner — Michael A Laflame, Jr.
(74) Attorney, Agent, or Firm — Schott, P.C.

(57) ABSTRACT

A coffee roasting apparatus is disclosed that comprises a compartment for holding coffee beans; a roasting element for roasting the coffee beans in said compartment; a controller for controlling the roasting element; and a sensor for monitoring a total amount of volatile organic compounds (VOCs) released by said coffee beans during roasting and providing the controller with an indication of said monitored amount. The controller is adapted to receive an indication of the total weight of the coffee beans in the compartment and control the roasting element as a function of the indication of the monitored total amount and the indication of the total (Continued)

weight, said function defining the total VOC release characteristics of said coffee beans during roasting. A coffee brewing apparatus and coffee roasting method are also disclosed.

11 Claims, 6 Drawing Sheets

(51) Int. Cl.
*A23F 5/04* (2006.01)
*A23N 12/12* (2006.01)

(56) References Cited

U.S. PATENT DOCUMENTS

| | | | |
|---|---|---|---|
| 7,285,300 B1 | 10/2007 | Allington | |
| 2004/0142078 A1 | 7/2004 | Eichner | |
| 2014/0242239 A1 * | 8/2014 | Boggavarapu | A23F 5/26 426/433 |
| 2017/0001794 A1 * | 1/2017 | Mathias | A23F 5/08 |

FOREIGN PATENT DOCUMENTS

| | | | |
|---|---|---|---|
| EP | 0715826 A1 | 6/1996 | |
| JP | 2001104161 A * | 4/2001 | A47J 31/40 |
| WO | 9923888 A1 | 5/1999 | |
| WO | 0028831 A1 | 5/2000 | |
| WO | 2012001522 A2 | 1/2012 | |
| WO | 2014114744 A2 | 7/2014 | |
| WO | 2014143291 A2 | 9/2014 | |

OTHER PUBLICATIONS

Office Action issued in connection with corresponding 201580064177.0, dated Feb. 2, 2019, 11 pages.

"Evidence of different favour formation dynamics by roasting coffee from different origins: On-line analysis with PTR-ToF-MS", Alexia N. Gloessa, Anita Vietri b, Flurin Wielanda, Samo Smrkea, Barbara Schönbächlera, José A. Sánchez Lópeza, Sergio Petrozzia, Sandra Bongers, Thomas Koziorowskic, Chahan Yeretziana, International Journal of Mass Spectrometry, pp. 365-366(2014) 324-337.

"Online monitoring of coffee roasting by proton transfer reaction time-offlight mass spectrometry (PTR-ToF-MS): towards a real-time process control for a consistent roast profile", Wieland F, Gloess AN, Keller M, Wetzel A, Schenker S, Yeretzian C. Anal Bioanal Chem. Mar. 2012;402(8):2531-43. doi: 10.1007/s00216-011-5401-9. Epub Sep. 23, 2011.

Chahan Yeretzian, Flurin Wieland & Alexia N. Gloess, "Progress on Coffee Roasting: A Process Control Tool for a Consistent Roast Degree Roast After Roast", Newfood vol. 15, Issue 3, 2012, pp. 22-26.

Project Idea Presentation Zurich University of Applied Sciences Dec. 16, 2013.

http://gcrmag.com/technology/view/measuring-the-roasting-process.

* cited by examiner

COFFEE ROASTING APPARATUS, COFFEE BREWING APPARATUS AND COFFEE ROASTING METHOD

This application is the U.S. National Phase application under 35 U.S.C. § 371 of International Application No. PCT/EP2015/076503, filed on Nov. 13, 2015, which claims the benefit of International Application No. PCT/CN2014/092111 filed on Nov. 25, 2014 and International Application No. 15159350.6 filed on Mar. 17, 2015. These applications are hereby incorporated by reference herein.

FIELD OF THE INVENTION

The present invention relates to a coffee roasting apparatus comprising a compartment for holding coffee beans; a roasting element for roasting the coffee beans in said compartment; and a controller for controlling the roasting element.

The present invention further relates to a coffee brewing apparatus comprising such a coffee roasting apparatus.

The present invention yet further relates to a method of roasting coffee beans, the method comprising heating the coffee beans to roast the coffee beans.

BACKGROUND OF THE INVENTION

Coffee has become one of the most popular beverages in modern society, with many different types and flavours of coffee being routinely available to a consumer, either in outlets such as coffee shops or in supermarkets for domestic use. The evolution of the popularity of coffee as a beverage has caused a shift in how coffee is being consumed, for instance in domestic settings.

Whereas in the past coffee would be predominantly brewed from instant coffee granules or from packaged ground coffee powders, e.g. using domestic coffee makers such as espresso machines or filter machines, nowadays a greater emphasis is placed on the freshness of the brewed coffee, which has triggered a rise in popularity of coffee roasting apparatuses. In such an apparatus, fresh, i.e. green, coffee beans can be roasted by a thermal process, e.g. using hot gases or by physical contact with a hot surface. During roasting at temperatures above 170° C., water is redistributed, and complex chemical reactions such as Maillard reaction and pyrolysis are induced. A fresh coffee powder can then be formed by grinding the freshly roasted coffee beans, thereby facilitating the brewing of fresh coffee. Such coffee is typically considered to have a superior taste compared to coffee brewed from packaged ground coffee powders.

The control of such a coffee roasting process is however far from trivial. Different users may require a different degree of roasting, e.g. a light roast or dark roast, of the coffee beans to cater for their personal taste. Moreover, different varieties of coffee beans will require different roasting times in order to achieve a certain roasting degree. Indeed, even different harvests of the same variety of coffee beans may exhibit variability in the required roasting times to achieve the desired degree of roasting. Therefore, one of the major challenges in providing a coffee roasting apparatus is to ensure that the roasted product meets customer expectation; e.g. has the desired degree of roasting.

Existing coffee roasting apparatuses such as the Nesco® Model CR-1000 Series of coffee roasters allow the user to specify the roasting time of the coffee beans in order to achieve the desired roasting result. Other roasting apparatuses offer control over the roasting process by allowing the user to specify the roasting temperature. However, as indicated above, it has been found that the desired roasting degree cannot be consistently achieved by (only) controlling the roasting time and/or temperature.

SUMMARY OF THE INVENTION

The present invention seeks to provide a coffee roasting apparatus that may produce roasted coffee beans in a more consistent manner.

The present invention further seeks to provide a coffee brewing apparatus comprising such a coffee roasting apparatus.

The present invention yet further seeks to provide a method of roasting coffee beans in a more consistent manner.

According to an aspect, there is provided a coffee roasting apparatus comprising a compartment for holding coffee beans; a roasting element for roasting the coffee beans in said compartment; a controller for controlling the roasting element; and a sensor for monitoring a total amount of VOCs (volatile organic compounds) released by said coffee beans during roasting and providing the controller with an indication of said monitored amount; wherein the controller is adapted to receive an indication of the total weight of the coffee beans in the compartment and control the roasting element as a function of the indication of the monitored total amount of VOCs and an indication of the total weight of the coffee beans in the compartment, said function defining the total VOC release characteristics of said coffee beans during roasting.

The present invention is based on the insight that the total amount of VOCs released per unit weight by the coffee beans varies in a consistent manner during roasting and as such can provide an accurate indication of the progress of the roasting process, such that the monitoring of this total amount, i.e. the sum of the amounts of various VOCs released by the coffee beans, can be used to accurately determine the degree of roasting of the coffee beans in the coffee roasting apparatus, such that the coffee roasting apparatus can be controlled using this parameter to produce consistent roasting results.

The coffee roasting apparatus may further comprise a user interface for specifying a desired degree of roasting, wherein the controller is responsive to the user interface and adapted to disable the roasting element if the received monitored amount corresponds to the total VOC release characteristics for the specified degree of roasting. This allows a user to specify the desired degree of roasting of coffee beans, which desired degree is typically related to the total amount of VOCs released per unit weight of the coffee beans, thus giving the coffee roasting apparatus greater flexibility as the apparatus can provide different degrees of roasting in a consistent manner.

The coffee roasting apparatus may obtain the indication of the total weight of the coffee beans in a suitable manner. In an embodiment, the user interface is further arranged to provide the controller with a user-specified indication of said total weight.

Alternatively, the indication of said total weight of the coffee beans in the compartment is provided by the sensor, and wherein the controller is adapted to derive the total weight from a point in time during roasting at which the rate of change of the total VOC concentration in the compartment exceeds a predefined threshold. The inventors have realised that the VOC release characteristics of the coffee beans can be used to identify certain points in the roasting process, such as the point of first cracking of the coffee beans. Moreover, the point in time during the roasting process at which such identifiable events in the roasting process occur, as indicated by the VOC released characteristics, is typically dependent of the total weight of the coffee beans in the compartment of the coffee roasting apparatus. Therefore, by monitoring the point in time at which a change in the rate at which the total amount of the VOCs are released by the coffee beans, the total weight of the coffee beans can be accurately estimated.

Alternatively, the coffee roasting apparatus may further comprise a weight sensor for providing the controller with the indication of the total weight of the coffee beans in the compartment. This provides an accurate determination of the total weight of the coffee beans in the coffee roasting apparatus, which enables particularly consistent roasting results.

In an embodiment, the compartment further comprises a gas outlet conduit, and wherein the sensor is located in fluid connection with said conduit. This has the advantage that the sensor may operate on a relatively small volume in which the gases are concentrated, i.e. does not need to operate on the full volume of the compartment, thereby enhancing sensitivity. To further enhance the exposure of the sensor to the VOCs released by the coffee beans, the coffee roasting apparatus may further comprise a pump arranged to force gases from the gas outlet conduit to the sensor.

In an embodiment, the controller is adapted to calculate the cumulative amount of VOCs released by the coffee beans during roasting and to control the roasting element in accordance with cumulative amount, e.g. by calculating the area under the VOC release curve over time. It has been found by the inventors that this provides a particularly accurate indication of the progress of the roasting process as different batches of coffee beans may show some variation in the VOC release characteristics different points in time, but the overall amount of VOCs released during the roasting process is typically relatively constant.

In a further embodiment, the coffee roasting apparatus further comprises a timer for providing the controller with timing information during roasting, wherein the controller is adapted to determine a deviation of the measured total amount of VOCs from the expected total VOC release characteristics for a point in time during roasting; and control the roasting element in response to the determined deviation. This further increases the consistency of the roasting process as a particular roasting result may be obtained if the roasting process is controlled to ensure that the VOC release characteristics of the coffee beans during the roasting process exhibit a desired pattern, as such a pattern for instance is typically indicative of the rate at which the coffee beans are roasted. Therefore, by monitoring deviations of the intended pattern and adjusting the roasting process to counteract observed deviations, the accuracy of the roasting process is improved.

The compartment of the coffee roasting apparatus may comprise an inlet; and the roasting element comprises a hot air source coupled to the inlet, wherein the coffee roasting apparatus further comprises a stirring element mounted in said compartment for stirring the coffee beans during roasting, wherein the controller is further adapted to control the stirring element. This may further improve the consistency of the roasting process as the controller may control the stirring element to control the heat transfer to the coffee beans.

A further improvement of the consistency of the roasting process may be achieved if the coffee roasting apparatus further comprises a cooling element, wherein the controller is further adapted to control the cooling element in order to control the temperature of the coffee beans during the roasting process.

According to another aspect, there is provided a coffee brewing apparatus including the coffee roasting apparatus of any of the above embodiments. Such a coffee brewing apparatus benefits from the improved consistency of the coffee roasting apparatus, thereby providing a coffee brewing apparatus that can brew coffee with an improved consistency in taste.

According to yet another aspect, there is provided a method of roasting coffee beans in a compartment of a coffee roasting apparatus, the method comprising providing total VOC release characteristics for the coffee beans during roasting as a function of a total weight of the coffee beans; receiving an indication of the total weight of the coffee beans in said compartment; receiving an indication of a total amount of VOCs released by the coffee beans during roasting; comparing the indication of the released total amount of VOCs against the provided total VOC release characteristics; and controlling the roasting of the coffee beans in accordance with said comparison. As explained above in more detail, by monitoring the total VOCs released characteristics of the coffee beans in the knowledge of the total weight of beans used in the roasting process, the degree of roasting of the coffee beans can be accurately controlled.

The method may further comprise calculating the cumulative amount of VOCs released by said coffee beans during roasting; and wherein said comparing step comprises comparing the cumulative amount against the provided total VOC release characteristics in order to terminate the roasting process once the coffee beans have released a predetermined cumulative amount of VOCs during roasting. This provides a particularly accurate method of controlling the degree of roasting of the coffee beans.

The method may further comprise controlling the roasting of the coffee beans in accordance with a deviation of the monitored total amount of VOC released by the coffee beans during roasting from the provided total VOC release characteristics. As explained above, as the time-dependent VOC release characteristics of an intended roasting process of the coffee beans tend to follow a consistent pattern, deviations from this pattern may be used to alter the roasting process such that it closely follows the intended roasting process, thereby further improving the consistency of the degree of roasting of the coffee beans.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

In the context of the present invention, VOCs are organic compounds, that have a defined minimum vapour pressure at room temperature (298K or 25° C.), e.g. organic compounds having a boiling point of less than or equal to 250° C., e.g. a boiling point in the range of 50-250° C. The total concentration of VOCs may be the total concentration of all VOCs released by the coffee beans 10 that can be detected by a VOC sensor.

Figure 1:
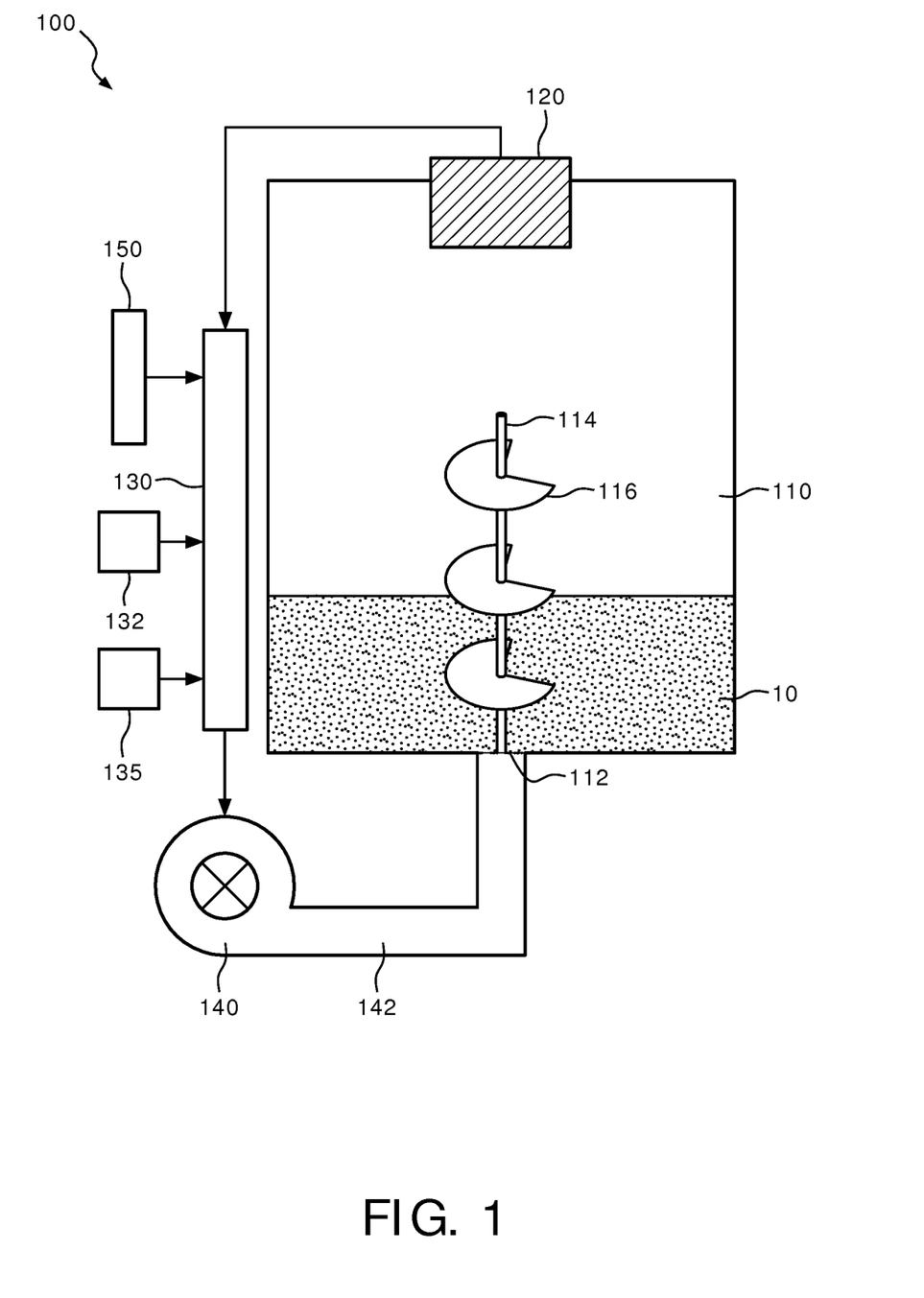
FIG. 1 schematically depicts a coffee roasting apparatus according to an embodiment.

FIG. 1 schematically depicts a coffee roasting apparatus 100 according to an embodiment. The coffee roasting apparatus 100 typically comprises a compartment 110 for storing coffee beans 10 therein. The compartment 110 may further comprise a stirring arrangement including stirring members, e.g. agitating blades 116 mounted on or otherwise affixed to a stirring bar 114 to stir the coffee beans 10 during the roasting process of the coffee beans. This stirring arrangement assists in ensuring a homogeneous roasting of the coffee beans 10 in the compartment 110. The stirring arrangement may be controlled in any suitable manner, for instance by a controller 130, which will be explained in further detail below.

The coffee roasting apparatus 100 typically further comprises a heating arrangement for heating the coffee beans 10 during the roasting process. In an embodiment, the heating arrangement may be controlled by the controller 130. The heating arrangement ensures that the coffee beans 10 are heated to an appropriate temperature at which the roasting of the coffee beans 10 takes place, i.e. an appropriate temperature at which the desired chemical reactions such as the Maillard reaction and pyrolytic reactions take place. In FIG. 1, the heating arrangement is embodied by a hot air generator 140 connected to an inlet 112 of the compartment 110 via a conduit 142 by way of non-limiting example only. In this embodiment, the inlet 112 is typically arranged such that the hot air is guided through the coffee beans 10 during the roasting process, e.g. when stirring the coffee beans 10 using the stirring arrangement. The inlet 112 may comprise a fine grid or the like to prevent coffee beans 10 from entering the conduit 142.

However, it should be understood that any suitable heating arrangement for heating the coffee beans 10 may be used, such as one or more heating elements attached to or integrated into the one or more walls of the compartment 110, in which case the inlet 112 may be omitted. As such heating arrangements are well-known per se, they will not be explained in further detail for the sake of brevity only.

The controller 130 is adapted to control the heating arrangement at least partially in response to a determined total amount of VOCs ($C_{total}$) released by the coffee beans 10 during roasting. This is based on the insight that the coffee beans 10 tend to release reproducible amounts of VOCs per unit weight of the coffee beans 10 during roasting ($C_{unit}$), with different amounts being released at different stages of the roasting process, such that the detection of a particular amount of VOCs released by the coffee beans 10 at a particular point in time during the roasting process can be used as an indication of the progression of the roasting process if the total weight W of the coffee beans 10 in the compartment 110 is (approximately) known, as indicated by equation 1:

$$C_{total}=C_{unit}*W \quad \text{Equation 1}$$

Figure 2:
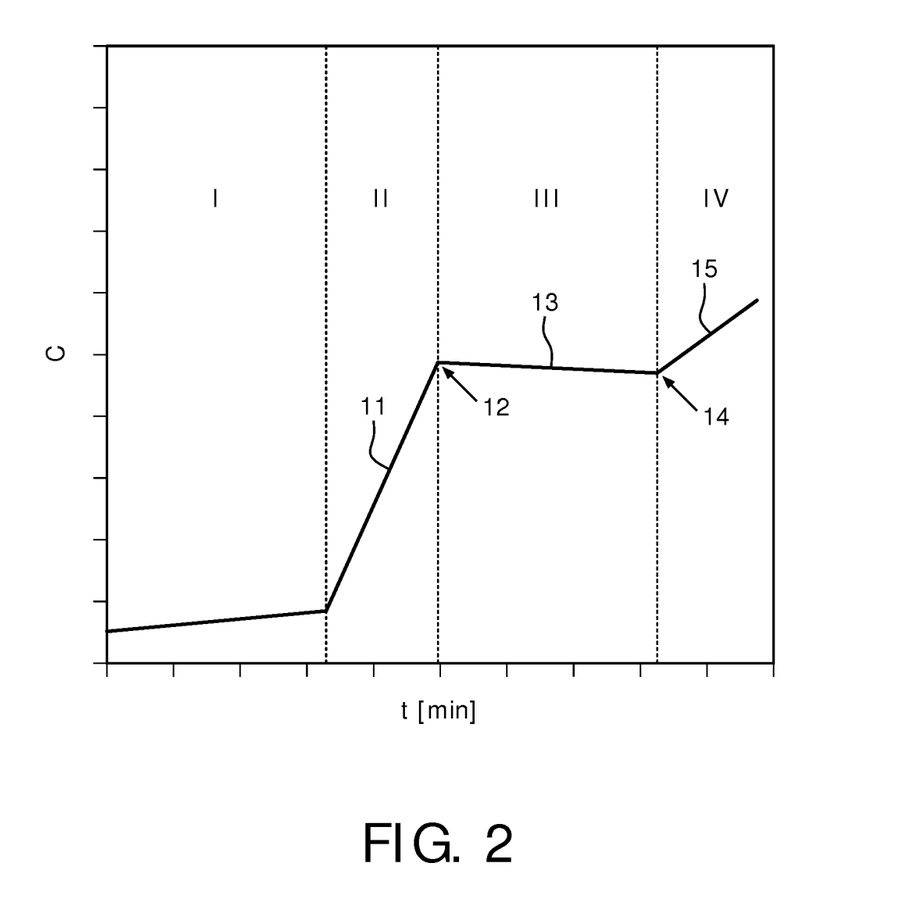
FIG. 2 schematically depicts VOC release characteristics by coffee beans during roasting.

An example total amount of VOC release profile as exhibited by the coffee beans 10 during roasting is schematically depicted in FIG. 2. The VOC release curve expresses the total concentration C of VOCs in the compartment 110 as a function of roasting time t. The curve can be divided into four distinct regions. The first region I is typically associated with the drying phase of the coffee beans 10, during which the total amount of VOCs released by the coffee beans 10 into the compartment 110 is typically close to zero, as indicated by a close to zero total concentration, and may increase only slightly if at all until the coffee beans enter the first cracking phase identified by region II, in which the total amount of VOCs released by the coffee beans 10 into the compartment 110 rapidly increases as indicated by segment 11 of the VOC release curve, leading to a rapid increase of the total concentration of the VOCs in the compartment 110. It is noted that this sudden rate of change of the total amount of VOCs released by the coffee beans 10 may also be correlated to the total weight of the coffee beans 10 in the compartment 110, as will be explained in further detail below.

Upon completion of the first cracking phase as indicated by point 12 in the VOC release curve, the rate of release of VOCs by the coffee beans 10 rapidly decreases, such that the rate of increase of the total concentration of VOCs in the compartment 110 is significantly reduced and may reach a zero or even slightly negative value during the third region as indicated by segment 13 of the VOC release curve. This steady state in the total amount of VOCs concentration as caused by smaller amounts of VOCs released by the coffee beans 10 during this stage is typically maintained until the coffee beans 10 enter the second cracking phase identified by point 14 in the VOC release curve, which second cracking phase as identified by region IV of the VOC release curve is typically characterized by a marked increase in the total VOC concentration in the compartment 110 due to an increase of the total amount of VOCs released by the coffee beans 10 during this phase.

As will be immediately understood by the skilled person, the above evaluation is based on a closed compartment 110 from which the VOCs cannot (rapidly) escape such that the total concentration of VOCs can be correlated to the total amount of VOCs present at any time in the compartment 110. Obviously, where the VOCs are removed from the compartment 110, e.g. by degassing the compartment 110, the total concentration of VOCs in the compartment 110 is less relevant. However, the total amount of VOCs may still be accurately determined, for instance by monitoring the amount or concentration of VOCs in a degassing channel, such that the detected total amount of VOCs at a given point in time may be used to provide an estimate of the progress of the roasting process. In other words, the roasting process implemented by the coffee roasting apparatus 100 may be controlled by determining an actual amount of VOCs released by the coffee beans 10 at a certain point in time and by comparing the actual amount against an expected amount indicative of a particular point in the roasting process, e.g. a particular degree of roasting of the coffee beans 10, such that the roasting process may be terminated upon the actual amount corresponding to the expected amount.

In an embodiment, in order to facilitate such a control mechanism, the coffee roasting apparatus 100 may comprise a VOC sensor 120 for detecting such a total concentration of the VOCs in the compartment 110. VOC sensors are well-known per se and are therefore not explained in further detail for the sake of brevity only. Any suitable VOC sensor may be used as the VOC sensor 120.

In addition, the controller 130 is arranged to receive an indication of the total weight W of the coffee beans 10 in the compartment 110 in order to determine the expected total amount of VOCs to be released by the coffee beans at a particular point of the roasting process, such that the controller 130 for instance may terminate the roasting process once the expected total amount of VOCs is actually released by the coffee beans 10 in the compartment 110 during roasting.

For instance, the coffee roasting apparatus 100 may further comprise a user interface 150, which may be used by a user to provide the controller 130 with an indication of the total weight of coffee beans 10 inserted into the compartment 110 for roasting and/or a desired roasting degree of the coffee beans 10. Any suitable type of user interface may be used for this purpose, such as one or more of a dial, a series of buttons, a programmable display, which may be a touch-screen display and so on.

Alternatively, the controller 130 may retrieve an indication of the total weight of the coffee beans 10 in the compartment 110 from the sensor signal received from the VOC sensor 120. As explained above, the coffee beans 10 release the total amounts of VOCs, e.g. total concentration of VOCs, at different rates during different stages of the roasting process. As indicated in FIG. 2 for instance, a marked increase in the rate of release of VOCs is observed at the start of the first cracking phase of the coffee beans 10. The point in time during the roasting process at which this marked increase occurs is a function of the total weight of the coffee beans 10 in the compartment 110. This can be understood from the fact that the coffee beans 10 needs to absorb a certain amount of heat in order to crack, such that the total amount of heat absorbed by the coffee beans 10 before first cracking can occur is a function of their total weight. As the heating arrangement 140 produces heat at a fixed rate, the amount of heat absorbed by the coffee beans 10 at which first cracking occurs therefore equals the product of the heat output of the heating arrangement 140 per unit time and the amount of time at which the heating arrangement 140 has produced this heat output.

Consequently, the controller 130 may monitor the point in time t during the roasting process at which the sudden increase in the rate of release of VOCs occurs, and may translate this point in time to an estimated total weight $W_{est}$ of the coffee beans 10 in the compartment 110 as per equation 2:

$$W_{est} = W_{unit} * t$$

In equation 2, $W_{unit}$ is the unit coffee bean weight for which first cracking occurs after a unit time period. The value of $W_{unit}$ may be determined in any suitable way, e.g. empirically determined using suitable experiments. To this end, the coffee roasting apparatus 100 may comprise a timer 132 to which the controller 130 is responsive in order to provide the controller 130 with the timing information required to estimate the total weight of the coffee beans 10. In FIG. 1, the timer 132 is shown as a separate unit by way of non-limiting example; it will be understood by the skilled person that it is equally feasible that the timer 132 forms part of the controller 130.

In order to determine when to terminate the roasting process, the controller 130 typically has access to expected total VOC release characteristics per unit weight of the coffee beans 10, which data may be incorporated into the controller 130 in the form of an algorithm or which data alternatively may be accessible in a data storage unit 135, e.g. a non-volatile memory element or the like. Such data, i.e. the expected total VOC release characteristics per unit weight of the coffee beans 10, typically expresses the total amount of VOCs released by the coffee beans 10 at a particular point in time during the roasting process, e.g. the typical amounts of VOCs released by the coffee beans at a certain roasting degrees. The expected total VOC release characteristics during roasting of the coffee beans 10 may be obtained in any suitable manner, e.g. empirically obtained using suitable experiments. In an embodiment, the expected total VOC release characteristics are generally applicable, i.e. independent of a particular type of coffee bean. In an alternative embodiment, the expected total VOC release characteristics are specific to a particular type of coffee bean, in which case the user may indicate, e.g. using the user interface 150, which type of coffee bean is to be roasted such that the controller 130 may accordingly select the appropriate expected total VOC release characteristics.

Consequently, the controller 130 is typically arranged to compare the actual total amount of VOCs released by the coffee beans 10 as determined by the VOC sensor 120 against the data indicating the expected total VOC release characteristics such that the controller 130 may terminate the roasting process when the actual total amount of VOCs released by the coffee beans 10 matches the expected total amount of VOCs released by the coffee beans for a particular roasting degree of the coffee beans.

In an embodiment, the controller 130 may be arranged to detect an individual actual value of the total amount of VOCs released by the coffee beans 10 and compare this detected individual actual value against an expected individual value in order to determine if the roasting process can be terminated. However, to avoid the premature determination of the roasting process, for instance because the coffee beans 10 may release the same total amount of VOCs at different points during the roasting process, the controller 130 may decide to terminate the roasting process only if certain waypoints during the roasting process as indicated by actual release characteristic of VOCs by the coffee beans 10 have occurred, such as the rapid rate increase in the release of VOCs during first cracking. This reduces the risk of premature termination of the roasting process.

This risk may further be reduced if the controller 130 is arranged to determine the cumulative total amount of VOCs reduced by the coffee beans 10 during the roasting process, e.g. by determining the area under the total amount of VOCs release curve over time. As this yields a continuously increasing value as a function of time, every value is unique and a particular reference point in the roasting process such that premature termination of the roasting process may be avoided altogether.

In the embodiment shown in FIG. 1, the coffee roasting apparatus 100 is adapted to obtain the estimated weight of the coffee beans 10 either from a user input or from the data provided by the VOC sensor 120 as previously explained. This has the advantage that no additional sensor is required, thereby reducing the cost of the coffee roasting apparatus 100 at the expense of potentially providing an approximate total weight only; for instance, the user may have provided an inaccurate total weight of the coffee beans 10 to be roasted or batch-dependent variations in the heat capacity of the coffee beans 10 may mean that the total weight of the coffee beans 10 as derived from the point in time of first cracking as explained above may also be approximate only.

Figure 3:
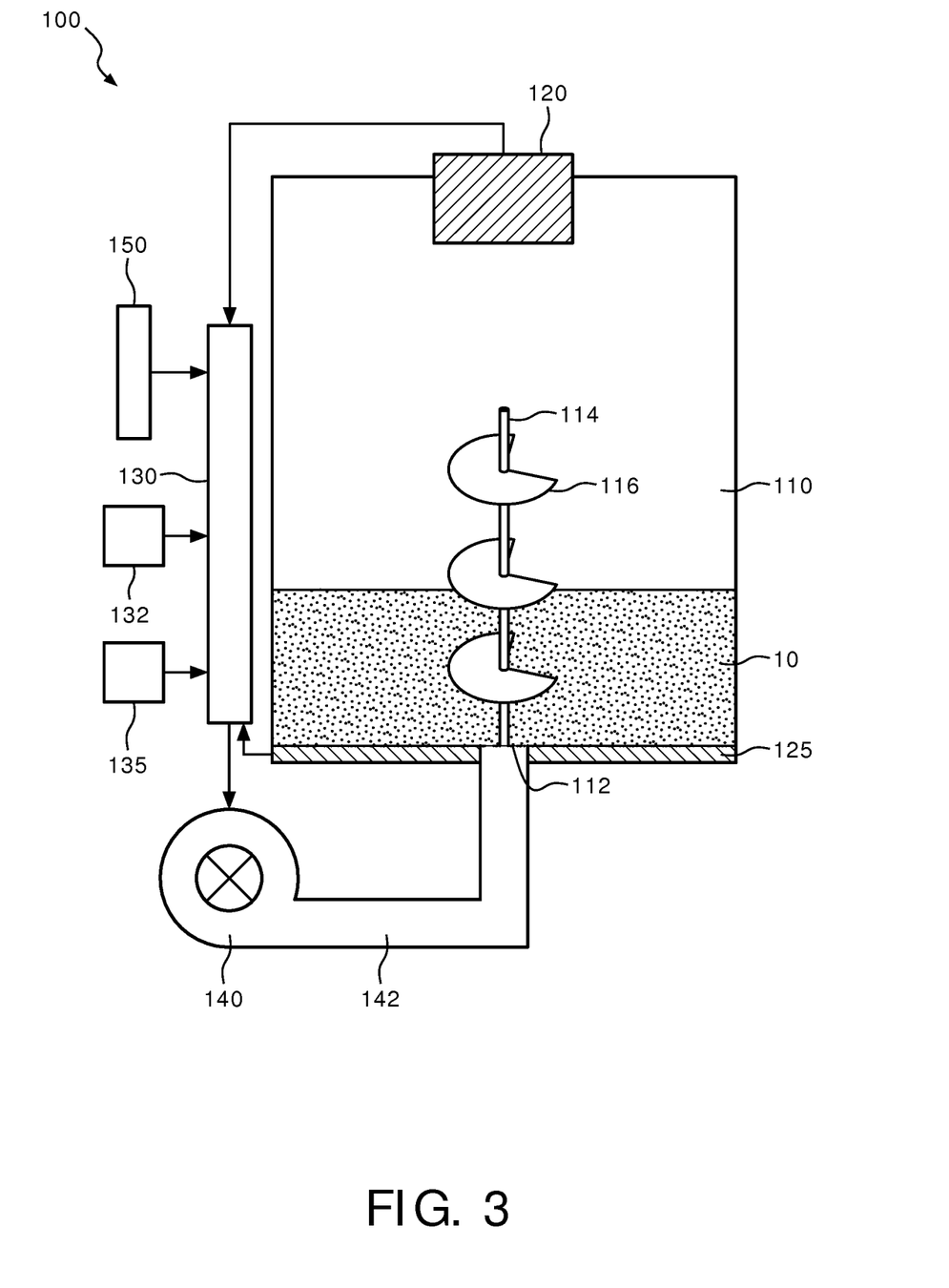
FIG. 3 schematically depicts a coffee roasting apparatus according to another embodiment.

In order to achieve a guaranteed accurate determination of the total weight of the coffee beans 10, the coffee roasting apparatus 100 may further comprise a weight sensor 125, as schematically depicted in FIG. 3. The weight sensor 125 may cooperate with the floor 111 of the compartment 110, e.g. the weight sensor 125 may include a resilient element, e.g. a spring or the like, which compression is a function of the load on the floor 111. The degree of compression may be measured to determine this load, i.e. the weight of the coffee beans 10. Other suitable embodiments of such a weight sensor will be apparent to the skilled person. As such weight sensors are well-known per se, this will not be explained in any further detail for the sake of brevity. It suffices to state that any suitable weight sensor may be used for this purpose.

Figure 4:
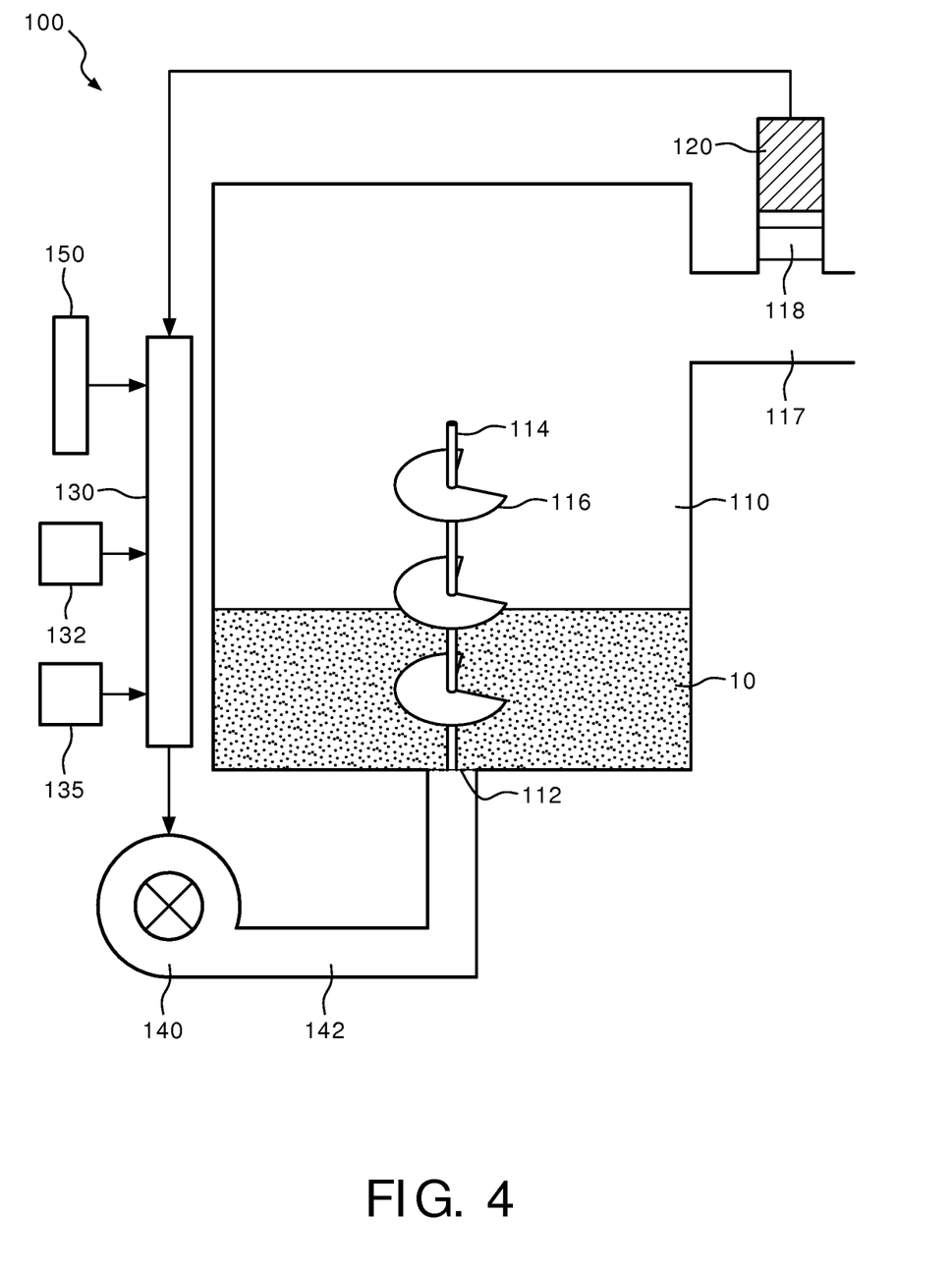
FIG. 4 schematically depicts a coffee roasting apparatus according to yet another embodiment.

In the above embodiments, the VOC sensor 120 is located within the compartment 110 by way of non-limiting example as it should be understood that the VOC sensor 120 may be located in any suitable location in which the total amount of VOCs released by the coffee beans 10 can be accurately determined. FIG. 4 schematically depicts a particularly suitable alternative arrangement in which the compartment 110 comprises a degassing channel 117 for removing gases from the compartment 110, wherein the VOC sensor 120 may be in fluid connection with the degassing channel 117, e.g. placed in the degassing channel 117 or in a chamber connected to the degassing chamber 117 as shown in FIG. 4. In order to force gases flowing through the degassing channel 117 towards the VOC sensor 120, a pumping member 118, e.g. a micro pump the like, may be placed in between the degassing chamber 117 and the VOC sensor 120 such that sufficient amounts of gases released from the compartment 110 through the degassing channel 117 can reach the VOC sensor 120 in order for the sensor to provide an accurate determination of the total amount of VOCs in the gases. Other arrangements are of course equally feasible, such as an arrangement in which the VOC sensor 120 is located in the degassing channel 117 and the pumping member 118 is located upstream or downstream from the VOC sensor 120 in the degassing channel 117.

In order to provide proof of concept, experiments were performed using Yirgacheffe and Guatemala Arabica coffee beans, in which different weights of coffee beans were roasted in accordance with the principles of the present invention, i.e. by terminating the roasting process upon the detection of a particular total amount of VOCs released by the coffee beans. In these experiments, a medium roast of the coffee beans was targeted, which typically yields coffee beans having a bean surface colour of around 57 on the Agtron/SCAA coffee colour scale.

TABLE 1

Roasting experiment details

| Experiment | Bean Type | Weight (g) | Terminating TVOC value (ppm) | Roasting colour |
|---|---|---|---|---|
| 1 | Yirgacheffe | 50 | 2.4 | 57.4 |
| 2 | Guatemala | 50 | 2.4 | 56.7 |
| 3 | Yirgacheffe | 75 | 2.8 | 57.7 |
| 4 | Guatemala | 75 | 2.8 | 57.7 |
| 5 | Yirgacheffe | 100 | 3.4 | 56.4 |
| 6 | Guatemala | 100 | 3.4 | 57.9 |

As can be seen in Table 1, termination of the roasting process upon the total concentration of VOCs reaching the indicated expected amount yielded excellent consistency in the roasting results with all roasts achieving a roasting colour deviating less than 2% from their intended roasting colour, which is indicative of the different weights of different types of coffee beans all achieving very similar degrees of roasting.

In the above embodiments, the controller 130 is adapted to terminate the heating arrangement 140 upon the total amount of VOCs released by the coffee beans 10 reaching a certain expectation value, either by determining an individual total amount or a cumulative total amount of VOCs released by the coffee beans 10 as previously explained. However, in some embodiments, the controller 130 may further be adapted to track the total amounts of VOCs released by the coffee beans 10 over time during the roasting process and to dynamically adjust the operation of the heating arrangement 140 in accordance with the tracked total amounts. More specifically, the expected VOC release characteristics of the coffee beans 10 over time, i.e. during the roasting process, may be indicative of the desired roasting profile to be applied to the coffee beans 10, e.g. the rate at which the coffee beans 10 are heated in order to achieve the desired degree of roasting. To this end, the controller 130 may be adapted to compare the actual value of the total amount of VOCs released by the coffee beans 10 at a certain point in time against the expected or desired value of the total amount of VOCs that this amount of coffee beans 10 at this point in time and to adjust the operation of the heating arrangement 140 if the actual value deviates from the expected or desired value.

Figure 5:
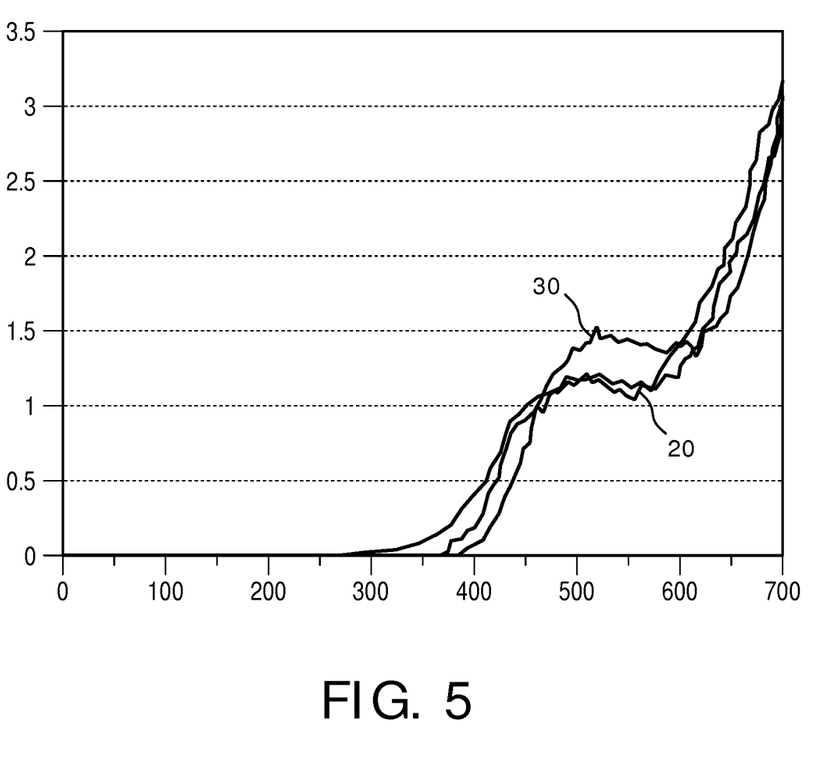
FIG. 5 schematically depicts intended and actual total VOC release characteristics of an example roasting process.

This is explained in more detail with the aid of FIG. 5, which schematically depicts an expected release curve 20 of the total amount of VOCs to be released by the coffee beans 10 during the roasting process and an actual release curve 30 of the coffee beans 10 during roasting. The total amount of VOCs is plotted on the y-axis and the amount of time lapsed during the roasting process is plotted on the x-axis. As can be seen, at the point in time around t=540 s, i.e. 9 minutes into the roasting process, the actual curve 30 significantly deviates from the expected curve 20.

This deviation may be used by the controller 130 to adjust the operation of the heating arrangement 140 accordingly. In the given example, as the actual amount of VOCs released by the coffee beans 10 exceeds the expected amount, this is an indication of the coffee beans 10 being too hot, i.e. the roasting process is proceeding too quickly, such that the controller 130 may reduce the amount of heat produced by the heating arrangement 140 or at least the amount of heat transferred from the heating arrangement 140 to the coffee beans 10, for instance by controlling the aforementioned stirring arrangement and/or by controlling a cooling element (not shown) for cooling the coffee beans 10 in the compartment 110. In the meantime, the controller 130 may continue the comparison between the actual value and the expected value of VOCs released by the coffee beans 10 in order to monitor if the adjustments to the operation of the heating arrangement 140 have resulted in the actual value corresponding to the expected value, after which the operation of the heating arrangement 140 may be readjusted accordingly as will be understood by the skilled person.

In an embodiment, the controller 130 is adapted to adjust the heating arrangement 140 if the aforementioned deviation exceeds a predetermined threshold to avoid the risk that the controller 130 constantly tries to adjust the operation of the heating arrangement 140.

In an embodiment, the coffee roasting apparatus 100 may store a plurality of such expected release curves 20, with different release curves corresponding to different degrees of roasting and/or different types of coffee beans, such that the coffee roasting apparatus 100 may be accurately controlled by the controller 130 for a particular degree of roasting and/or a digital type of coffee bean in order to achieve particularly consistent roasting results.

It will be understood that the aforementioned embodiments are non-limiting examples of possible arrangements and that many other arrangements are equally suitable; for instance, even though the embodiment of the coffee roasting apparatus 100 as shown in FIGS. 1, 3 and 4 has been explained using a discrete controller 130, it is equally feasible that at least some of the discrete components form part of a single arrangement. For instance, the controller 130 may form part of the VOC sensor 120 and so on.

The coffee roasting apparatus 100 may be integrated in a coffee brewing apparatus further comprising a coffee bean grinder and a coffee brewing stage. For instance, the coffee brewing apparatus may be arranged to automatically transfer a portion of the roasted coffee beans into the coffee bean grinder for grinding, after which the ground coffee is automatically transported into the coffee brewing stage for brewing a fresh cup of coffee. As such coffee brewing apparatuses are well-known per se, this will not be explained in further detail for reasons of brevity only. It should be understood that the particular embodiment of such a coffee brewing apparatus is not critical to the present invention and that any suitable arrangement of such coffee brewing apparatus may be contemplated.

Figure 6:
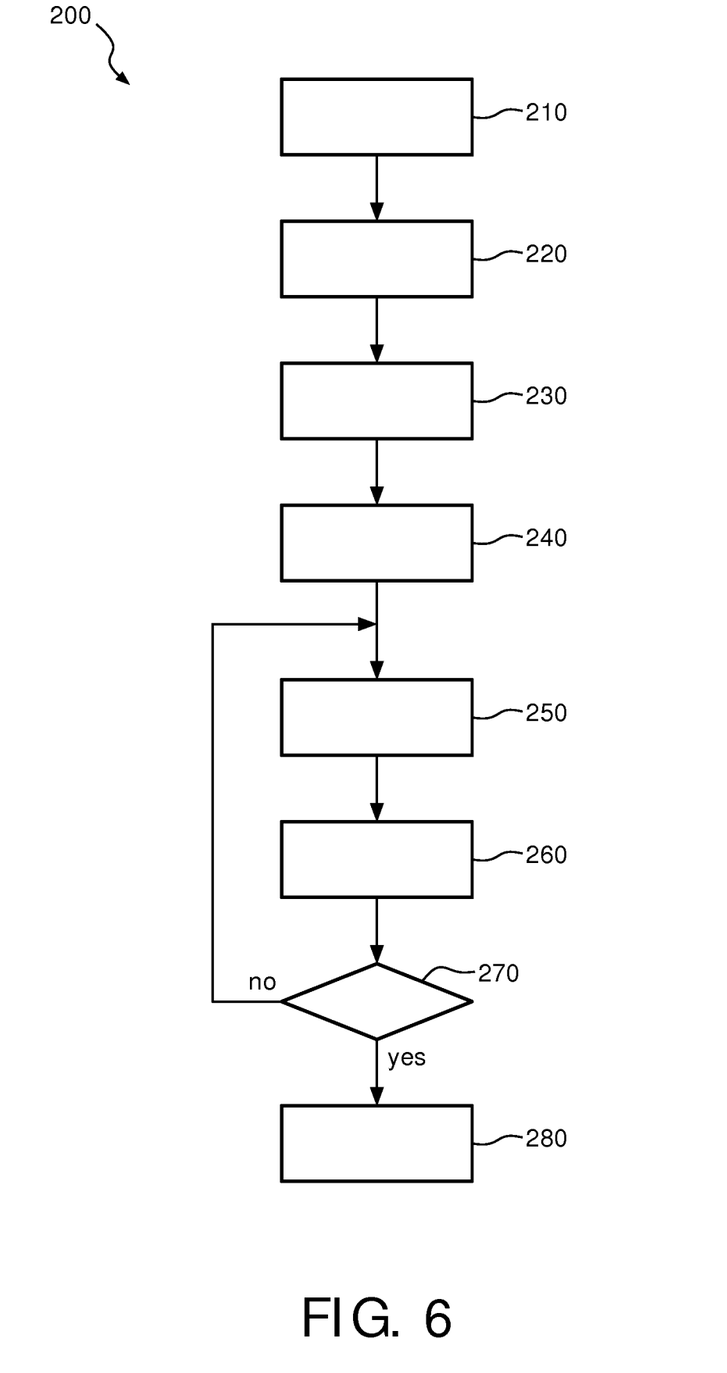
FIG. 6 depicts a flow chart of a method according to an embodiment.

FIG. 6 depicts a flowchart of a method 200 of roasting coffee beans in a compartment 110 of a coffee roasting apparatus 100 according to an embodiment. The method starts in step 210 in which the coffee roasting apparatus 100 is initialized, e.g. by placing the coffee beans 10 in the compartment 110, after which the method proceeds to step 220 in which the expected release curves of the total amount of VOCs to be released by the coffee beans 10 during roasting are provided; this step may be omitted if these release curves are already present in the coffee roasting apparatus 100, for instance in the data storage element 135 or embedded in the controller 130 as previously explained. In an embodiment, step 220 may simply comprise the controller 130 accessing the appropriate release curve.

The method 200 subsequently proceeds to step 230 in which an indication of the total weight of the coffee beans 10 in the compartment 110 is provided, either by a user or by a sensor such as the VOC sensor 120 await sensor 125 as previously explained. Once the indication of the total weight of the coffee beans 10 is provided in this manner, the method proceeds to step 240 in which the roasting process of the coffee beans 10 is started under control of the controller 130. During the roasting process, the total amount of VOCs released by the coffee beans 10 is monitored in step 250, e.g. by using the VOC sensor 120, and compared in step 260 against the expected total amount of VOCs released by the coffee beans 10 at a particular point in time as indicated in the release curve provided in step 220, which step may further optionally comprise adjusting the operation of the heating arrangement 140 upon a deviation between actual VOC release value and expected VOC release value as previously explained.

Next, it is checked in step 270 if the roasting process may be terminated, for instance because an individual or cumulative total amount of VOCs released by the coffee beans 10 has reached an expected value indicative of the coffee beans 10 having reached the desired degree of roasting. If this is not yet the case, the method reverts back to step 250 and continues to monitor the release of VOCs by the coffee beans 10. If on the other hand it is determined in step 270 that the roasting of the coffee beans 10 has been completed, the method 200 proceeds to step 280 in which the roasting process is terminated.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A coffee roasting apparatus comprising:
a compartment for holding coffee beans;
a roasting element for roasting the coffee beans in said compartment;
a controller for controlling the roasting element; and
a sensor for monitoring a total amount of volatile organic compounds (VOCs) released by said coffee beans during roasting and providing the controller with an indication of said monitored total amount of VOCs,
wherein the controller is adapted to receive an indication of a total weight of the coffee beans in the compartment and control the roasting element as a function of the indication of the monitored total amount of VOCs and the indication of the total weight of the coffee beans in the compartment at a specific instance of time, said function defining a total VOC release characteristics of said coffee beans during roasting.

2. The coffee roasting apparatus of claim 1, further comprising a user interface for specifying a desired degree of roasting, wherein the controller is responsive to the user interface and adapted to disable the roasting element if the monitored total amount of VOCs corresponds to the total VOC release characteristics for the specified degree of roasting.

3. The coffee roasting apparatus of claim 2, wherein the user interface is further arranged to provide the controller with a user-specified indication of said total weight of the coffee beans in the compartment.

4. The coffee roasting apparatus of claim 1, wherein the indication of said total weight of the coffee beans in the compartment is provided by the sensor, and wherein the controller is adapted to derive the total weight of the coffee beans in the compartment from the specific instance of time during roasting at which the rate of change of a total VOC concentration in the compartment exceeds a predefined threshold.

5. The coffee roasting apparatus of claim 1, further comprising a weight sensor for providing the controller with the indication of the total weight of the coffee beans in the compartment.

6. The coffee roasting apparatus of claim 1, wherein the compartment further comprises a gas outlet conduit, and wherein the sensor is located in fluid connection with said gas outlet conduit.

7. The coffee roasting apparatus of claim 6, further comprising a pump arranged to force gases from the gas outlet conduit to the sensor.

8. The coffee roasting apparatus of claim 1, wherein the controller is adapted to calculate a cumulative amount of VOCs released by the coffee beans during roasting and to control the roasting element in accordance with the cumulative amount of VOCs.

9. The coffee roasting apparatus of claim 1, further comprising a timer for providing the controller with timing information during roasting, wherein the controller is adapted to:

determine a deviation of the monitored total amount of VOCs from an expected total VOC release characteristics for a point in time during roasting; and control the roasting element in response to the determined deviation.

10. The coffee roasting apparatus of any of claim 1, wherein:

the compartment comprises an inlet; and the roasting element comprises a hot air source coupled to said inlet;

the coffee roasting apparatus further comprising a stirring element mounted in said compartment for stirring the coffee beans during roasting, and wherein the controller is further adapted to control the stirring element.

11. The coffee roasting apparatus of claim 1, further comprising a cooling element, wherein the controller is further adapted to control the cooling element.

* * * * *